(12) United States Patent
Secondini et al.

(10) Patent No.: US 9,166,703 B2
(45) Date of Patent: Oct. 20, 2015

(54) EQUALIZER FOR AN OPTICAL TRANSMISSION SYSTEM

(75) Inventors: Marco Secondini, Rome (IT); Enrico Forestieri, Parma (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 637 days.

(21) Appl. No.: 13/148,309

(22) PCT Filed: Feb. 20, 2009

(86) PCT No.: PCT/EP2009/052071
§ 371 (c)(1), (2), (4) Date: Oct. 5, 2011

(87) PCT Pub. No.: WO2010/094339
PCT Pub. Date: Aug. 26, 2010

(65) Prior Publication Data
US 2012/0027418 A1    Feb. 2, 2012

(51) Int. Cl.
*H04B 10/00*    (2013.01)
*H04B 10/06*    (2006.01)
(Continued)

(52) U.S. Cl.
CPC ...... *H04B 10/6971* (2013.01); *H04L 25/03133* (2013.01)

(58) Field of Classification Search
CPC ............. H04B 10/25133; H04B 10/00; H04B 10/2519; H04B 10/2525; G02B 6/29394; H04L 25/03019; H04L 25/03025; H04L 27/2028; H04L 25/061; H04L 25/062; H04L 25/063
USPC .................................................. 398/158, 192
See application file for complete search history.

(56) References Cited

U.S. PATENT DOCUMENTS 5,640,512 A * 6/1997 Czerwiec ...................... 714/47.2
6,286,104 B1 * 9/2001 Buhle et al. ........................ 726/4
(Continued)

FOREIGN PATENT DOCUMENTS

EP    1107599 A2    6/2001

OTHER PUBLICATIONS

Ho ["Electronic Compensation Technique to Mitigate Nonlinear Phase Noise" Journal of Lightwave Technology vol. 22 No. 3 Mar. 2004].*

(Continued)

*Primary Examiner* — Oommen Jacob
(74) *Attorney, Agent, or Firm* — Patent Portfolio Builders PLLC

(57) ABSTRACT

An equalizer (60) processes, in the electrical domain, a signal obtained from a path of an optical transmission system. The equalizer comprises N cascaded stages (where N≥1). At least one of the stages comprises a cascade of a linear equalization element (61) and a non-linear equalization element (62). The equalizer (60) is able to compensate for both linear impairments, such as dispersion, and non-linear impairments. The cascaded linear and non-linear elements can simulate the effect of signal propagation through a fiber which has the opposite propagation parameters (e.g. attenuation, dispersion, non-linearity) to those of the propagation path experienced by a signal in the transmission system. The non-linear equalization element (62) can be a non-linear phase rotator which rotates phase of an input signal proportional to the squared modulus of the input signal amplitude. The linear equalization element (61) can comprise a digital filter, such as an Infinite Impulse Response (IIR) filter or a Finite Impulse Response (FIR) filter.

21 Claims, 8 Drawing Sheets

(51) Int. Cl.
*H04B 10/69* (2013.01)
*H04L 25/03* (2006.01)

(56) References Cited

U.S. PATENT DOCUMENTS

| | | | |
|---|---|---|---|
| 7,970,811 B2* | 6/2011 | Shen | 708/819 |
| 2005/0226316 A1 | 10/2005 | Higashino et al. | |
| 2006/0013597 A1 | 1/2006 | Crivelli et al. | |
| 2006/0140262 A1* | 6/2006 | Kuijk et al. | 375/232 |
| 2008/0031633 A1 | 2/2008 | Hoshida et al. | |
| 2008/0240467 A1* | 10/2008 | Oliver | 381/103 |

OTHER PUBLICATIONS

Bulow ["PMD mitigation at 10Gbit/s using linear and nonlinear integrated electronic equaliser and circuits" Electronics Letters Jan. 20, 2000 vol. 36 No. 2].*

Bulow et al., Electronic PMD Mitigation—from Linear Equalization to Maximum-Likelihood Detection, Proc. Optical Fiber Comm. Conf., Mar. 17, 2001, pp. WAA3-1-WAA3-3.

Colavolpe et al., Multilevel Optical Systems with MLSD Receivers Insensitive to GVD and PMD, J. Lightwave Tech., May 15, 2008, pp. 1263-1273, vol. 26, No. 10, IEEE.

Foggi et al., Maximum-Likelihood Sequence Detection with Closed-Form Metrics in OOK Optical Systems Impaired by GVD and PMD, J. Lightwave Tech., Aug. 2006 pp. 3073-3086, vol. 24, No. 8, IEEE.

Hasegawa et al., Transmission of Stationary Nonlinear Optical Pulses in Dispersive Dielectric Fibers I. Anomalous Dispersion, Appl. Phys. Letts., Aug. 1, 1973, pp. 142-144, vol. 23, No. 3, Amer. Inst. Phys.

Ho et al., Electronic Compensation Technique to Mitigate Nonlinear Phase Noise, J. Lightwave Tech., Mar. 2004, pp. 779-783 vol. 22, No. 3, IEEE.

Taylor, Coherent Detection Method Using DSP for Demodulation of Signal and Subsequent Equalization of Propagation Impairments, Photonics Tech. Letts., Feb. 2004, pp. 674-676, vol. 16, No. 2, IEEE.

Xia et al., Nonlinear Electrical Equalization for Different Modulation Formats with Optical Filtering,, J. Lightwave Tech., Apr. 2007, pp. 996-1001, vol. 25, No. 4, IEEE.

EPO, International Search Report in PCT/EP2009/052071, Feb. 11, 2009.

* cited by examiner

EQUALIZER FOR AN OPTICAL TRANSMISSION SYSTEM

TECHNICAL FIELD

This invention relates to an equaliser for use in an optical transmission system.

BACKGROUND

The performance of fibre-optic transmission systems is affected by amplifier noise and transmission impairments, such as Chromatic Dispersion (CD), Polarization Mode Dispersion (PMD), and non-linear effects. Transmission impairments become more relevant as the bit-rate increases. The compensation, or mitigation, of transmission impairments by electronic processing in direct-detection systems is not simple and may be ineffective because of the information loss caused by direct-detection. On the other hand, in coherent systems, all linear impairments such as CD or PMD could be exactly compensated by electronic equalisers. The use of coherent systems with electronic processing at the receiver also allows for reducing the symbol-rate by deploying efficient multilevel modulation formats, such as DQPSK and QAM, which are more resilient to CD and PMD. In addition, phase, frequency, and polarization locking of local oscillators, previously required in coherent receivers, can be conveniently substituted by electronic post-processing. For these reasons, coherent systems have been recently proposed again as a promising solution for next generation high-capacity fibre-optic links.

Techniques are known for equalisation of signals to compensate for impairments during transmission. These techniques include linear equalization based on feed forward equalisers (FFE), decision feedback equalisers (DFE), maximum likelihood sequence detection (MLSD), and Non-linear Tapped Delay Line (TDL) equalisers based on Volterra kernels. Most solutions of electronic processing/equalisation in fibre-optic systems refer to the mitigation of linear impairments (CD and PMD) in direct detection systems by means of FFE+DFE (H. Bulow and G. Thielecke, "Electronic PMD mitigation—From linear equalization to maximum-likelihood detection," in Proc. OFC, 2001, vol. 3, pp. WDD34-1-WDD34-3), MLSD (T. Foggi, E. Forestieri, G. Colavolpe, and G. Prati, "Maximum-likelihood sequence detection with closed-form metrics in OOK optical systems impaired by GVD and PMD," J. Lightwave Technol., vol. 24, no. 8, pp. 3073-3087, August 2006), or non-linear TDL (C. Xia, and W. Rosenkranz "Nonlinear electrical equalization for different modulation formats with optical filtering," J. Lightwave Technol., vol. 25, no. 4, April 2007). Recently, the exact compensation of linear impairments in coherent systems by means of FFE has been investigated and some MLSD strategies for the exact compensation of linear impairments in systems with differential detectors have been also proposed.

High transmission bit-rates (e.g. ≥40 Gbit/s) require high-speed digital processing. Computational cost is a driving factor and it is desirable that the complexity of an equaliser in transmission equipment is kept as low as possible. Linear equalisers, such as FFE, are not able to compensate for non-linear impairments and so have a limited effectiveness, while MLSD has a high complexity (exponential with channel memory). Proper metrics and suitable channel estimation techniques for the non-linear fibre-optic channel are still unknown. Non-linear TDL equalisers based on Volterra kernels have a high complexity (exponential with non-linearity order).

SUMMARY

A first aspect of the present invention provides an equaliser for processing, in the electrical domain, a signal obtained from a path of an optical transmission system, the equaliser comprising N cascaded stages (where N≥1), wherein at least one of the stages comprises a cascade of:
a linear equalisation element; and
a non-linear equalisation element.

The equaliser is able to compensate for both linear impairments, such as dispersion, and non-linear impairments and has a lower complexity than general non-linear Tapped Delay Line equaliser schemes based on Volterra kernels. The equaliser is especially suitable for next generation coherent optical systems, where performance is likely to be limited by non-linear impairments.

The cascaded linear and non-linear elements can simulate the effect of signal propagation through a fibre which has the opposite propagation parameters (e.g. attenuation, dispersion, non-linearity) to those of the propagation path experienced by a signal in the transmission system. The main signal impairments are chromatic dispersion and Kerr nonlinearity. These act simultaneously and in a distributed way along a fibre. Although the equaliser can have a single stage (N=1), it will have limited effectiveness. It has been found that a better compensation for these effects can be achieved by alternately compensating for a small amount of dispersion and for a small amount of nonlinearity (and so on), approximating a simultaneous and distributed compensation of the impairments. The effectiveness of the equaliser increases with the number of cascaded stages. Advantageously, the equaliser has a plurality of cascaded stages (N≥2). More advantageously, N≥10 and even more advantageously, N≥50.

Advantageously, the non-linear equalisation element is a non-linear phase rotator. Advantageously, the non-linear equalisation element is arranged to rotate phase of an input signal proportional to the squared modulus of the input signal amplitude.

The linear equalisation element can comprise a digital filter, such as an Infinite Impulse Response (IIR) filter or a Finite Impulse Response (FIR) filter.

The linear equalisation element can be omitted, or by-passed, in at least one of the stages, depending on what response is required for the equaliser. Similarly, the non-linear equalisation element can be omitted, or by-passed, in at least one of the stages, depending on what response is required for the equaliser.

The order of the linear equalisation element can be the same in each stage, or it can differ across the stages.

The equaliser can make use of the electronic processing capabilities that will be available in next generation coherent optical receivers and, therefore, the equaliser can give a significant performance improvement with only a slight increase of complexity.

Advantageously the equaliser operates on digitised complex samples of a received optical field which have been obtained by a coherent optical receiver.

Factors such as thermal fluctuations, mechanical vibrations and stresses of the fibre-optic channel can induce time-variations to the light path, and these can become significant at high bit-rates. Moreover, in a network architecture, light-paths between transmitters and receivers may be switched during transmission, with a subsequent change of the channel characteristics. Advantageously, the response of the equaliser is variable, during operation, to compensate for these time-varying impairments. Advantageously, a processor is arranged to adaptively determine the values of elements of the equaliser during operation of the transmission system.

Another aspect of the invention provides a method of equalising, in the electrical domain, a signal obtained from an optical transmission path, the method comprising:

processing the signal by a plurality of N cascaded processing stages (where N≥1), wherein at least one of the processing stages comprises:

processing the signal with a linear equalisation function; and processing the signal with a non-linear equalisation function.

The equaliser can be implemented as hardware, software, or a combination of these. Accordingly, a further aspect of the present invention provides machine-readable instructions (software) for causing a processor to perform the method. The machine-readable instructions may be stored on an electronic memory device, hard disk, optical disk or other machine-readable storage medium. The machine-readable instructions can be downloaded to a processor via a network connection.

BRIEF DESCRIPTION OF THE DRAWINGS

Embodiments of the invention will be described, by way of example only, with reference to the accompanying drawings in which.

DETAILED DESCRIPTION

Figure 1:
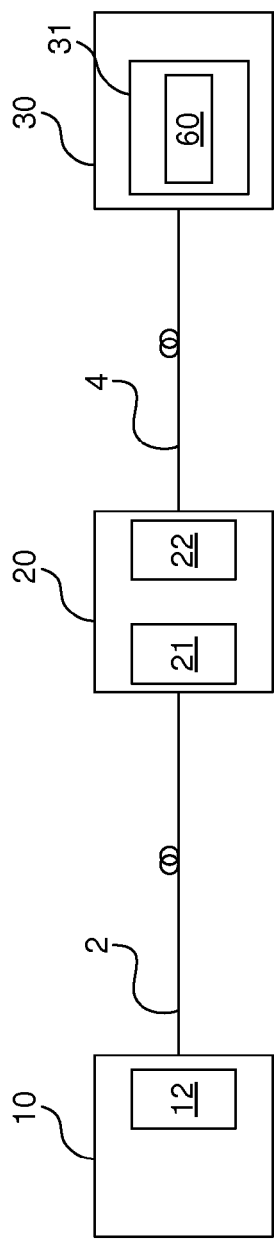
FIG. 1 shows an optical transmission system.

FIG. 1 schematically shows an example optical transmission system in which the equaliser can be used. Nodes 10, 20, 30 of the system are connected by optical fibre links 2, 4. Node 10 has a transmitter 12. Node 20 has a receiver 21 and a transmitter 22. Node 30 has a receiver 31. An equaliser 60 is shown as part of the receiver 31 at node 30. The purpose of the equaliser 60 is to compensate for impairments to a received signal which have been introduced during propagation through the optical transmission system. The equaliser can alternatively, or additionally, be incorporated in a transmitter 12, 22 to pre-equalise a signal before transmission.

Figure 2:
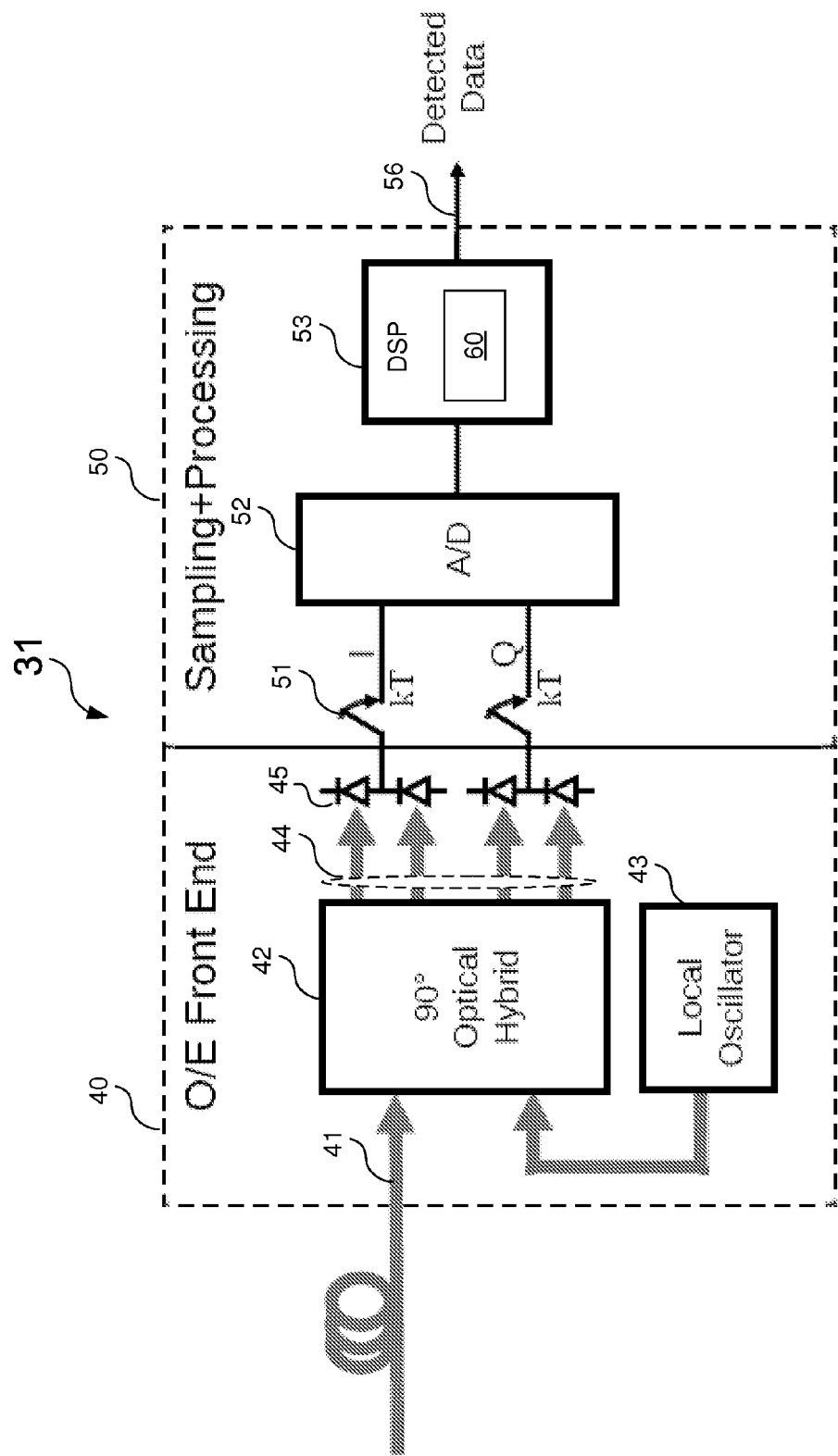
FIG. 2 shows a node for use in the optical transmission system of FIG. 1.

FIG. 2 shows receiver 31 in more detail. Receiver 31 is a coherent optical receiver. An optical signal received from optical link 4 is applied to an input 41 of a 90° optical hybrid 42, where it is mixed with an optical signal from a local oscillator 43. The optical hybrid 42 generates four output signals 44. The four optical output signals are then applied to two pairs of balanced photodetectors 45, which convert the optical signals to the electrical domain. At this point the signals are analog. The electrical analog signals are sampled 51 (typically at a sampling rate of T=Ts/2, where Ts is the signalling rate) to obtain the in-phase (I) and quadrature (Q) components of the received optical signal. The I and Q samples (that constitute the real and imaginary part of the detected complex sample, respectively) are then applied to an analog-to-digital converter (ADC) 52. Digital values are applied to a processing unit, shown here as a Digital Signal Processor (DSP) 53. The DSP block 53 performs the equalisation functions 60 described here. DSP 53 also includes a decision device which operates on the equalised signal, to obtain the output detected data 56. All DSP software is typically implemented on a single ASIC and can also include additional operations, e.g., phase/frequency recovery. It can be seen that equaliser 60 operates in the electrical domain. An optical signal received from the link 4 is first converted to the electrical domain by an optical-to-electrical converter, and then processed in the electrical domain. The coherent RX obtains samples (proportional to) of the complex envelope of the optical signal (which are complex). Those samples carry all the information that is required to compensate for transmission impairments and retrieve data with best performance. This can be compared with a direct-detection receiver, which takes samples that are proportional to the squared modulus of the complex envelope. The samples taken by the direct-detection receiver ignore the phase of the complex envelope. Compensating for transmission impairments (even linear such as chromatic dispersion) after direct-detection is much harder and less efficient.

Figure 3:
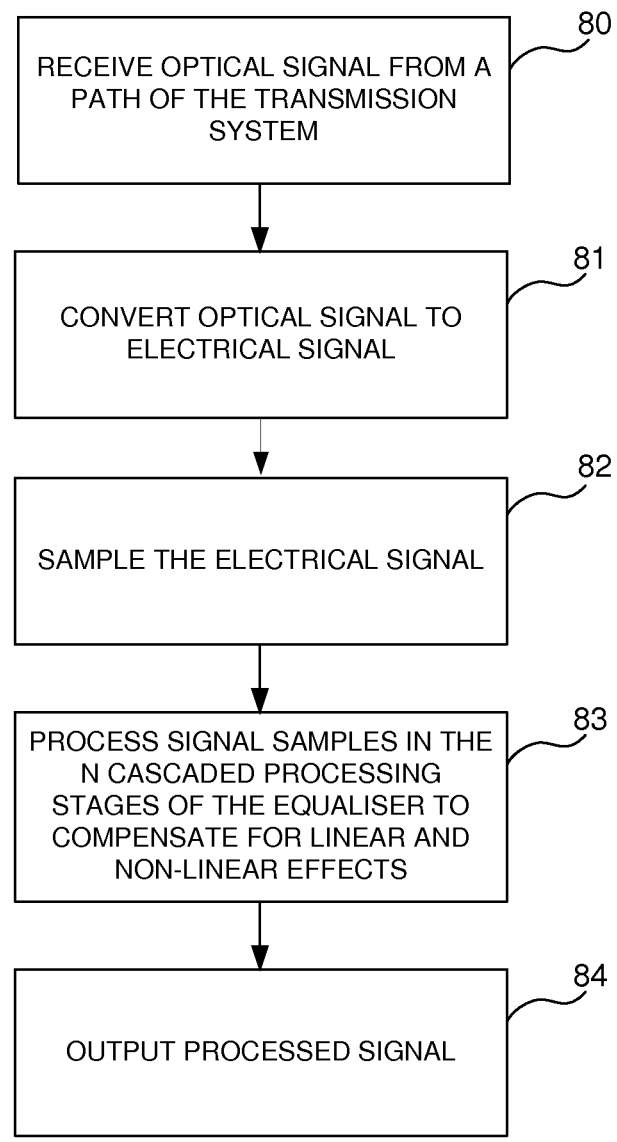
FIGS. 3 and 4 show methods of processing a signal at a node.

FIG. 3 shows a flow chart of an overall method of processing a signal at a receiver, such as receiver 31 in FIGS. 1 and 2. The method begins at step 80 by receiving an optical signal from a path (e.g. link 4) of the transmission system. At step 81 the optical signal is converted into an electrical signal. At step 82 the electrical signal is sampled to generate a sequence of samples. At step 83 the signal samples are processed by an equaliser which comprises N cascaded processing stages, where N≥1. The equalisation process compensates for linear and non-linear effects which have been introduced to the received signal in the path leading to the receiver 31. The processed (equalised) signal is output at step 84.

Figure 4:
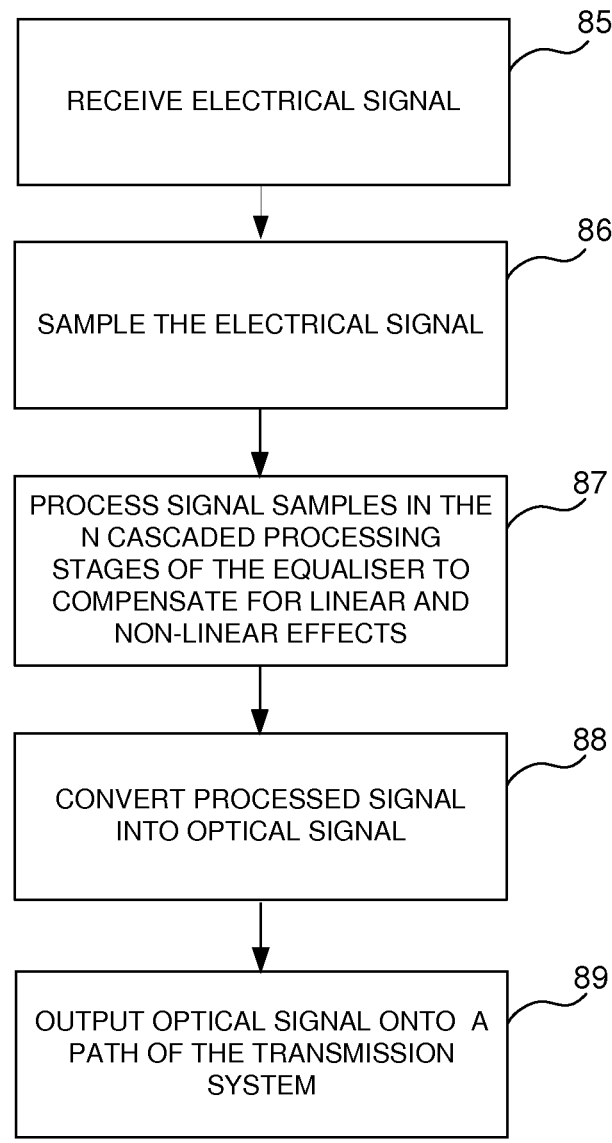

FIG. 4 shows a flow chart of an overall method of processing a signal at a transmitter, such as transmitter 22 in FIG. 1, to pre-equalise a signal before transmission. The method begins at step 85 by receiving an electrical signal. At step 86 the electrical signal is sampled, if it is not already in sampled form. At step 87 the signal samples are processed by an equaliser which comprises N cascaded processing stages, where N≥1. The equalisation process compensates, in advance, for linear and non-linear effects which are expected to affect the signal during onward transmission. The processed (equalised) signal is converted into an electrical signal at step 88 and then output at step 89 onto a path of the transmission system.

Figure 5:
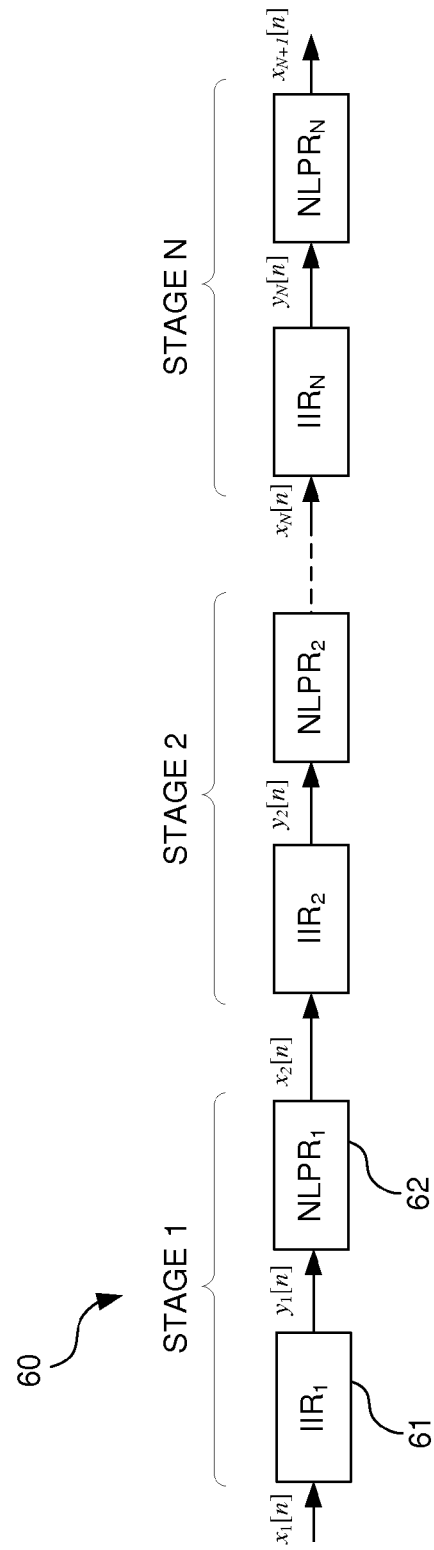
FIG. 5 shows an equaliser for use in a node of the optical transmission system.

FIG. 5 schematically shows the equaliser 60. The equaliser 60 comprises a number of stages. The stages are arranged in cascade, i.e. the output of one stage is applied to the next stage, the output of the next stage is applied to the subsequent stage, and so on. Each stage can comprise two cascaded elements: a tunable linear equalisation element 61 and a tunable non-linear equalisation element 62. Both elements 61, 62 operate in the time-domain on a sequence of received digital data.

The linear equalisation element 61 can also be called a dispersive element. In its general configuration, each linear equalisation element 61 is realised as a digital filter, which can be an Infinite Impulse Response (IIR) filter or a Finite Impulse Response (FIR) filter. In general, a linear filter (a FIR or an IIR filter) multiplies the spectrum of the input signal by a transfer function, that can be arbitrarily changed (with some constraints) by tuning the filter coefficients. In particular, the main interest is in compensating the group velocity dispersion caused by the fibre, also called chromatic dispersion. Different frequency components (colours) of the signal travel at a different speed and thus spread in time during propagation through the fibre, causing an interference between adjacent transmitted symbols. This corresponds to multiplying the spectrum of the signal by a transfer function with unitary amplitude and parabolic phase. This effect can be compensated by a FIR or IIR filter that has approximately a frequency response with unitary amplitude and opposite phase.

Each non-linear equalisation element 62 is realised as a non-linear phase rotator. The non-linear equalisation element 62 has the effect of rotating the phase of the input signal by a quantity that is proportional to the squared modulus of the signal amplitude. This effect will compensate the analogous effect that is caused by Kerr nonlinearity in the fibre. The non-linear equalisation element 62 can be considered as an instantaneous non-linear element, meaning that the output of the non-linear element depends only on the input, and not on any stored value within the element.

Each element 61, 62 has parameters which can be set, or tuned, to give the element a desired response. The input complex samples, $x_1[n]$, that are applied to the equaliser are obtained by coherent detection and analog-to-digital conversion and are assumed to be (ideally) proportional to the optical field complex envelope.

Generally, the ability of the equaliser to approximate the (inverse of) the effects of fibre propagation increases with an increasing number, N, of stages in the equaliser 60. The minimum number, N, of stages in the equaliser could be one, but this is expected to have poor performance. The maximum number, N, of stages in the equaliser is determined by practical considerations (processing power of available technology, processing time, cost). A reasonable number should be in the range of tens for an adaptive device. A higher number (hundreds) can be used, but it becomes more difficult to process the signal in real-time with reasonable processing resources.

Figure 6:
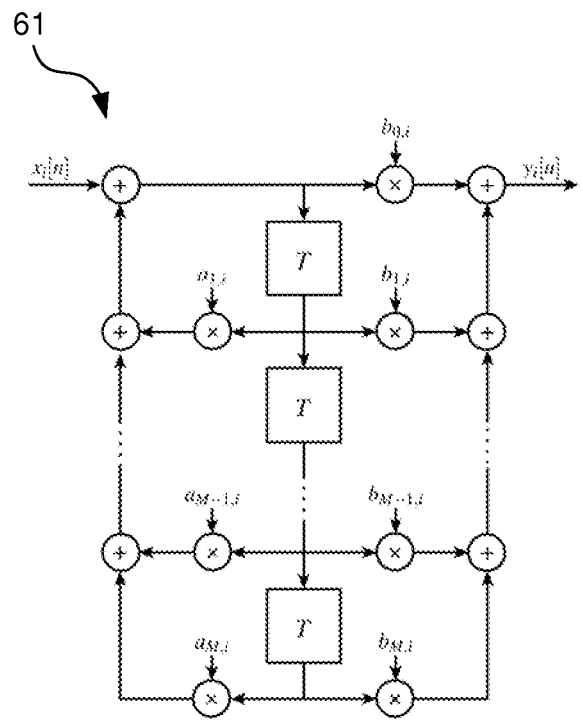
FIG. 6 shows an Infinite Impulse Response (IIR) filter which can be used as a linear equalisation element in the equaliser of FIG. 5.

FIG. 6 shows an IIR filter which can be used as a linear equalisation element 61 in the equaliser of FIG. 5. For convenience, FIG. 6 shows the IIR filter in canonic direct form, as this uses the minimum number of delay elements T. Other forms can be used, such as the cascade form or parallel form, and they result in a filter having the same response. The filter comprises a plurality of time delay elements T. The time delay T is equal to the sampling period of the received signal and determines the free spectral range of the filter. A good choice is a fractionally spaced equaliser, with $T=T_s/2$, where $T_s$ is the symbol-rate, although different choices can be considered in order to reduce the complexity (synchronous equaliser with $T=T_s$) or increase the free spectral range ($T<T_s/2$). The filter shown in FIG. 6 has an order M, and $a_{1,i}, \ldots, a_{M,i}, b_{0,i}, \ldots, b_{M,i}$ are the complex tunable coefficients of the filter. The filter input and output satisfy the following difference equation:

$$y_i[n] = \sum_{k=1}^{M} a_{i,k} y_i[n-k] + \sum_{k=0}^{M} b_{i,k} x_i[n-k]$$

where:
$y_i[n]$ is the output signal of the IIR filter stage;
$a_{i,k}$ and $b_{i,k}$ are complex tunable coefficients of the filter;
$y_i[n-k]$ is a delayed version of the output signal of the filter;
$x_i[n-k]$ is a delayed version of the input signal to the filter.

Figure 7:
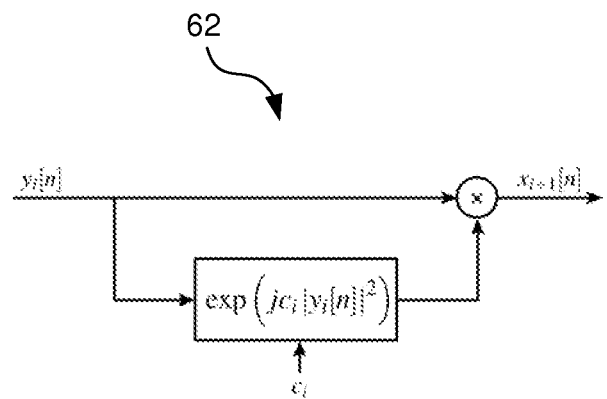
FIG. 7 shows a Non-Linear Phase Rotator which can be used as a non-linear equalisation element in the equaliser of FIG. 5.

FIG. 7 shows a Non-Linear Phase Rotator (NLPR) which can be used as a non-linear equalisation element 62 in the equaliser of FIG. 5. The NLPR in FIG. 7 is an instantaneous non-linearity that rotates the phase of the output sample proportionally to the squared modulus of the input sample:

$$x_{i+1}[n] = y_i[n] \exp(jc_i |y_i[n]|^2)$$

where:
$x_{i+1}[n]$ is the output of the NLPR;
$y_i[n]$ is the input signal to the NLPR;
$c_i$ is the real tunable coefficient of the NLPR that determines the amount of phase rotation.

Considering the overall equaliser, the order M of the linear filter 61 can be the same in each stage of equaliser 60, or the order M of the linear filter 61 can differ between stages of the equaliser. The linear equalisation element 61 can be omitted, or by-passed, in at least one of the stages, depending on what response is required for the equaliser 60. Similarly, the non-linear element 62 can be omitted, or by-passed, in at least one of the stages, depending on what response is required for the equaliser 60. An equalisation element can be by-passed by selectively routing a signal around the element, or by setting values of filter coefficients in the element to a value that will have no effect on the signal. In most cases, this requires filter coefficients to be set to zero, but in the IIR of FIG. 6 coefficient $b_{0,i}$ should be set to one. The type of linear equalisation element 61 can be the same in each of the N stages of the equaliser, or different filter types (FIR, IIR) can be used across the N stages. Some advantageous configurations will now be described:

IIR+NLPR, as shown in FIG. 5. A stage comprises a cascade of an IIR filter (of a desired order) and a NLPR.

Figure 8:
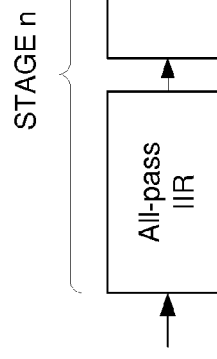
FIGS. 8 and 9 show stages of the equaliser.

FIR+NLPR, as shown in FIG. 8. A stage comprises a cascade of an FIR filter (of a desired order) and a NLPR.

Figure 9:
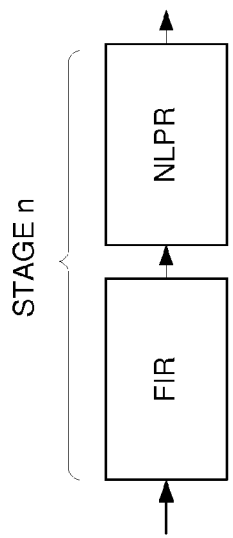

All-pass+NLPR, as shown in FIG. 9. A stage comprises a cascade of an all-pass IIR filter and a NLPR. This scheme is particularly advantageous as it reproduces the main fibre characteristics of dispersion and Kerr non-linearity. The NLPR elements generate phase rotations in the time-domain that are proportional to the input intensity (in the same manner as the Kerr non-linearity occurring during propagation in fibre). The all-pass IIR elements generate linear phase distortion across all frequencies in the frequency domain, avoiding amplitude distortions (in the same manner as fibre dispersion).

Figure 10:
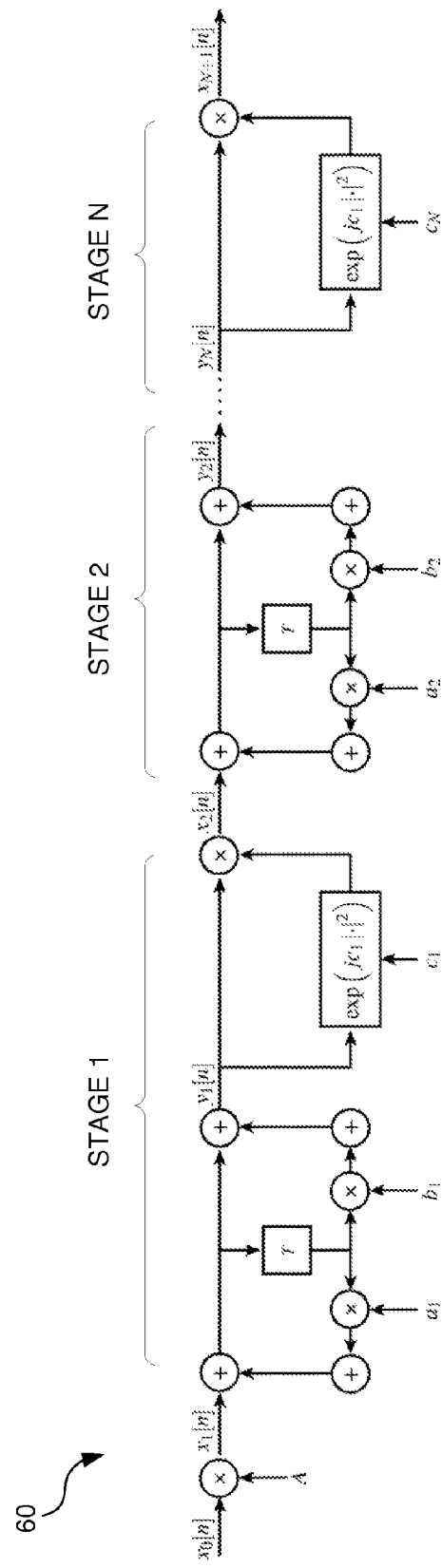
FIG. 10 shows a generic structure for the equaliser which can be used to create a desired equaliser response.

FIG. 10 shows another example of an equaliser 60 with a total of N cascaded stages. In each stage, the linear element is a first-order IIR filter having a single delay element T (M=1 for each IIR filter) and the non-linear equalisation element is a NLPR. The tunable coefficient $b_{0,i}$ shown in the canonic form of the IIR (FIG. 6) can be fixed to one by scaling all of the other coefficients and adding a single tunable coefficient A at the input (or, equivalently, at the output or at an intermediate point) of the equaliser. This gives the scheme of FIG. 10, where each stage is made of an IIR filter with a single delay element (M=1) and two tunable coefficients ($a_i$, $b_i$), and an NLPR with one tunable coefficient ($c_i$). The following recursion defines the relationship between the input and output of the equaliser shown in FIG. 10:

$$x_1[n] = Ax_0[n]$$

$$y_i[n] = a_i y_i[n-1] + x_i[n] + b_i x_i[n-1]$$

$$x_{i+1}[n] = y_i[n] \exp(jc_i |y_i[n]|^2)$$

where:
$a_i$, $b_i$, $c_i$ are tunable coefficients;
$x_i[n]$ is the input to the ith stage;
$y_i[n]$ is the input to the NLPR in the ith stage.

Although FIG. 10 has a first-order IIR filter (M=1) in each stage, by posing some proper constraints on the tunable coefficients, a wide variety of different equalisers can be reproduced by the scheme of FIG. 10. The scheme of FIG. 10 can be seen as a "building block" which can be used to generate any desired structure of the equaliser. The following are possible:

IIR+NLPR: as shown in FIG. 10. Setting $a_i$ $b_i$ and $c_i$ to desired (non-zero) values gives an N-stage non-linear equaliser, where each stage comprises a cascade of a first-order IIR filter and a NLPR.

FIR+NLPR: setting $a_i=0$ for i=1, . . . , N, disables the feedback paths in each IIR filter. Each IIR filter is now an FIR filter. This gives an N-stage non-linear equaliser, where each stage comprises a cascade of a first-order FIR filter and a NLPR.

All-pass+NLPR: setting $a_i=b_i^*$ for i=1, . . . , N, gives an N-stage non-linear equaliser where each stage comprises a cascade of a first-order all-pass IIR filter and a NLPR. The value $b_i^*$" is the complex conjugate of $b_i$. This combination of elements is shown in FIG. 9. As described above, this scheme reproduces the main fibre characteristics (dispersion and Kerr non-linearity).

If a higher-order linear element is required for any stage of the equaliser of FIG. 5, the coefficients in FIG. 10 can be set as follows:

higher-order IIR filter: set $c_i=0$ for M consecutive stages gives a cascade of M first-order IIR stages. As explained earlier, this is equivalent to an M-order IIR filter. Setting $c_i=0$ for M−1 consecutive stages leaves one of the NLPR elements active, and thereby gives a cascade of an M-order IIR filter and a NLPR element.

higher-order FIR filter: setting $c_i=0$ & $a_i=0$ for M consecutive stages disables the feedback paths in each IIR filter. Each IIR filter is now an FIR filter. This gives a cascade of M first-order FIR stages, that is equivalent to an M-order FIR filter. Setting $c_i=0$ for M−1 consecutive stages & $a_i=0$ for M consecutive stages leaves one of the NLPR elements active, and thereby gives a cascade of an M-order FIR filter and a NLPR element.

Higher-order all-pass IIR filter: setting $c_i=0$ & $a_i=b_i^*$ for M consecutive stages gives a cascade of M first-order all-pass IIR stages. This is equivalent to an M-order all-pass IIR filter. Setting $c_i=0$ for M−1 consecutive stages & $a_i=b_i^*$ for M consecutive stages leaves one of the NLPR elements active, and thereby gives a cascade of an M-order all-pass IIR filter and a NLPR element.

Providing higher-order filters in one or more of the N stages of the equaliser of FIG. 5 using the structure shown in FIG. 10 requires a different (higher) value of N in FIG. 10 compared to that of FIG. 5. For example, if each of the N stages of FIG. 5 has an M-order filter, the value of N in FIG. 10 is N.M. In addition, if a linear equalisation element is not required in a stage, set $a_i=0$ & $b_i=0$. If a linear equalisation element is not required in a number (say T) consecutive stages, this gives T cascaded NLPRs, that are equivalent to a single NLPR with tunable coefficient $c=c_1+ \ldots +c_T$. Alternatively, set $a_i=0$ & $b_i=0$ for T stages and set $c_i=0$ for T−1 consecutive stages gives a single NLPR.

Parameters of the stages of the equaliser can be set in several ways. In a first operating mode, which will be called static equalization, an optimal configuration for the parameters of the equaliser is determined off-line, by extensive simulations and/or system characterization and tuning. The parameters of the equaliser are set at the optimal value and remain fixed during transmissions. In this operating mode, the equaliser can be placed at the transmitter, receiver, or both.

Figure 11:
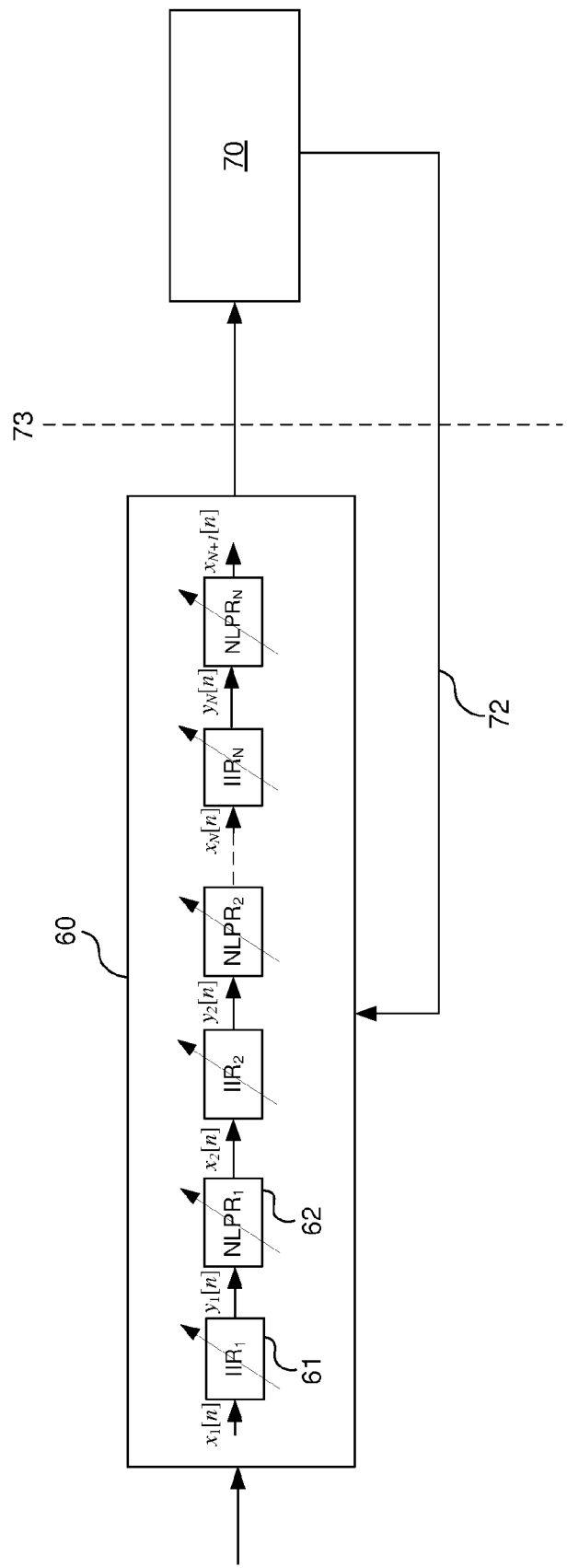
FIG. 11 shows apparatus for adaptively controlling parameter values of the equaliser.

In a second operating mode, which will be called adaptive equalisation, an optimal configuration for the parameters of the equaliser is determined adaptively during transmissions, in order to optimise some performance parameter. Different performance parameters and control algorithms can be used. One such performance parameter is the mean square error (MSE), with the control algorithm varying parameters of the equaliser to minimise the MSE. A convenient control algorithm is a gradient algorithm. FIG. 11 schematically shows apparatus for performing adaptive equalisation. Linear equalisation elements 61 and non-linear equalisation elements 62 of the stages of the equaliser 60 have adjustable parameters (e.g. the filter coefficients $a_i$, $b_i$, $c_i$). A controller 70 monitors a performance parameter of the processed signal (such as MSE) and controls 72 the values of the adjustable parameters. A control loop exists between the equaliser 60, controller 70 and control output 72. Typically, the equalizer parameters (filter coefficients) are iteratively tuned, in order. The effect of each change to parameters is observed, with the aim of decreasing the output MSE, until a minimum MSE condition is reached.

Processor 70 monitors a performance parameter of a received signal. As explained earlier, the equaliser can be implemented in a receiver or a transmitter of an optical transmission network. When the equaliser is implemented in a receiver, the equaliser 60 and the processor 70 are usually located in the same network node. When the equaliser is implemented in a transmitter, the equaliser 60 and the processor 70 are located in different network nodes (as indicated by the dashed line 73 in FIG. 11). The equaliser is located at a transmitting node (e.g. as part of transmitter 22 in node 20 of FIG. 1) and the processor is located at a receiving node (e.g. as part of receiver 31 in node 30 of FIG. 1). The equaliser processes a source signal in a manner which compensates for impairments which will be caused to the signal during transmission en route to a receiver. The signal arriving at the receiver should approximate the source signal, when the equalisation is optimal. The performance parameter is monitored at the processor 70 in the receiving node and control signal 72, indicating changes to parameters of the equaliser, is sent to the equaliser 60. Alternatively, the processor 70 in the receiving node can send a control signal which carries the measured value of the performance parameter, and the equaliser can determine what parameters to change based on the value of the performance parameter.

Figure 12:
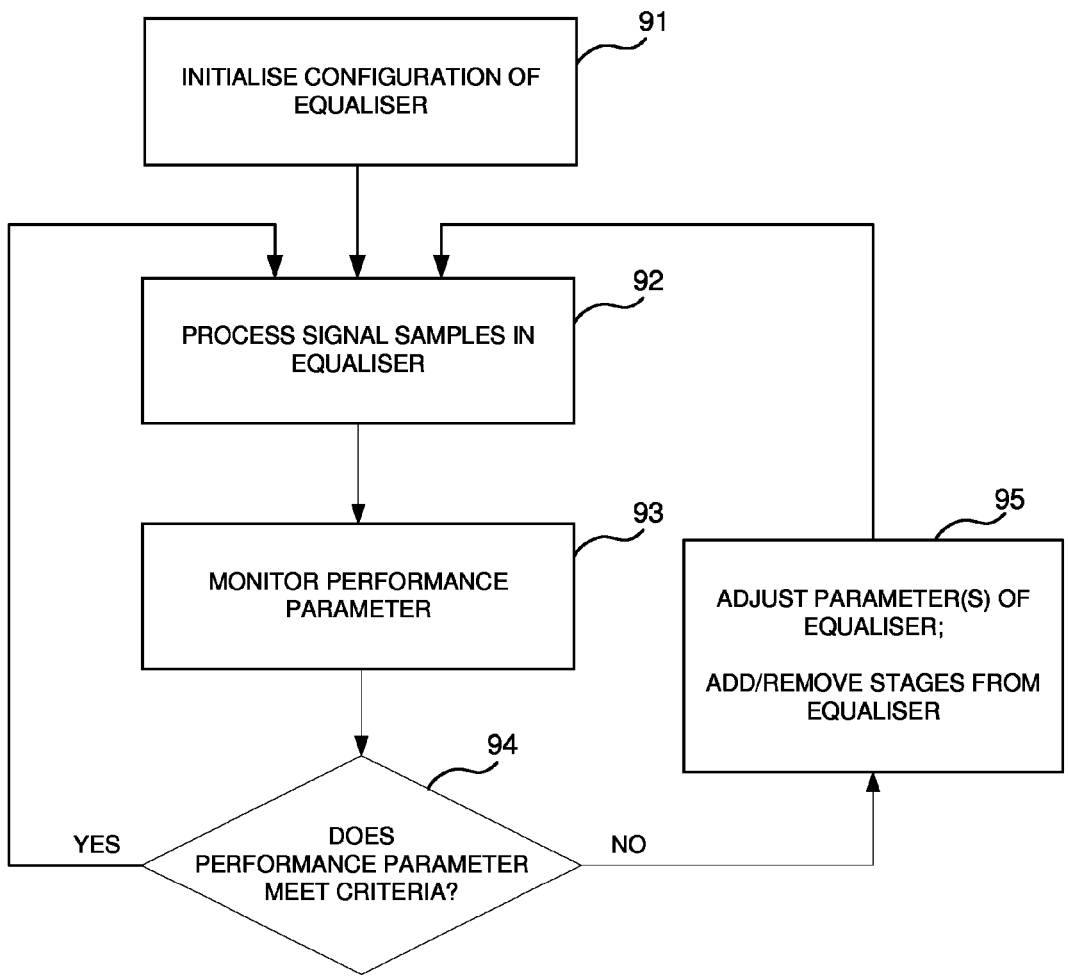
FIG. 12 shows a method of adaptively changing the equaliser during transmission.

FIG. 12 shows a flow chart of a method to adaptively configure the equaliser. The method begins at step 91 by initialising the configuration of the equaliser. This can use a default number of stages, a default type of linear element (e.g. IIR) and a set of default parameters for each element. At step 92 digital samples of traffic are processed by the equaliser, using the initial configuration of the equaliser. At step 93, a performance parameter (such as MSE) is monitored. At step 94, a check is made of whether the value of the performance parameter meets a performance criteria. This is a way of determining if the equaliser performance is acceptable. If the performance is acceptable, the method returns to step 92 and signal samples are processed using the existing equaliser parameters. However, if the check at step 94 indicates that the performance is not acceptable, then the method proceeds to step 95. At step 95, the configuration of the equaliser is adjusted. The changes in configuration can take various forms:

A parameter, or set of parameters, can be adjusted. A parameter, or set of parameters may be adjusted in a single stage at a time, in order to prevent any large changes to the signal and to observe the effect of the change. Alternatively, parameters can be adjusted in a larger number of stages at a time.

An additional stage, or stages, can be added to the equaliser to improve the response of the equaliser. This is possible providing the computational load does not exceed maximum available.

A stage, or stages, can be removed from the equaliser. This can be useful to reduce processing load and improve convergence to an optimal configuration.

The type of linear equalisation element can be changed. For example, an IIR element can be changed to an FIR element (or vice versa).

The invention is not limited to the embodiments described herein, which may be modified or varied without departing from the scope of the invention.

The invention claimed is:

1. An equalizer for processing, in a digital electrical domain, a signal obtained from a path of an optical transmission system, the equalizer disposed in a digital signal processor and comprising a plurality of cascaded stages, where at least two of the plurality of cascaded stages each comprise a cascade of:
   a linear equalization element; and
   a non-linear equalization element, the linear equalization element and the non-linear equalization element each comprising adjustable parameters,
   wherein the digital signal processor is configured to monitor a performance parameter of the equalizer and to control values of the adjustable parameters to optimize the performance parameter,
   wherein the non-linear equalization element is a non-linear phase rotator, and
   wherein the linear equalization element compensates for dispersion and the non-linear equalization element compensates for nonlinearity in each of the at least two of the plurality of cascaded stages.

2. The equalizer of claim 1, wherein the non-linear equalization element has an input for receiving an input signal and is arranged to rotate a phase of the input signal proportional to a squared modulus of an amplitude of the input signal.

3. The equalizer of claim 1, wherein the linear equalization element is one of a finite impulse response filter and an infinite impulse response filter.

4. The equalizer of claim 1, wherein, in at least one of the cascaded stages that comprises the cascade of the linear equalization element and the non-linear equalization element, the linear equalization element is an infinite impulse response filter.

5. The equalizer of claim 4, wherein the linear equalization element is an all-pass infinite impulse response filter.

6. The equalizer of claim 1, wherein, in at least one of the cascaded stages that comprises the cascade of the linear equalization element and the non-linear equalization element, the linear equalization element is a finite impulse response filter.

7. The equalizer of claim 1, wherein each of the plurality of cascaded stages comprise a cascade of:
   a linear equalization element; and
   a non-linear equalization element.

8. The equalizer of claim 1, wherein each of the plurality of cascaded stages comprises a cascade of:
   a first-order infinite impulse response filter having configurable parameters; and
   a non-linear element configured to be selectively bypassed.

9. The equalizer of claim 8, wherein a configurable parameter of the first-order infinite impulse response filter in each cascaded stage is configurable to cause the filter to perform as a first-order finite impulse response filter.

10. The equalizer of claim 1, wherein at least one of the plurality of cascaded stages comprises only a linear equalization element.

11. The equalizer of claim 1, wherein the plurality of cascaded stages comprises 10 cascaded stages.

12. The equalizer of claim 1, wherein the plurality of cascaded stages comprises 50 cascaded stages.

13. A system, comprising:
   an equalizer for processing, in a digital electrical domain, a signal obtained from a path of an optical transmission system, the equalizer comprising a plurality of cascaded stages, where at least two of the plurality of cascaded stages each comprise a cascade of:
   an adaptable linear equalization element; and
   an adaptable non-linear equalization element, the linear equalization element and the non-linear equalization element each comprising a plurality of adjustable parameters; and
   a processor in communication with the linear equalization element and the non-linear equalization element of each of the plurality of cascaded stages to monitor a performance parameter of the equalizer and to control values of the plurality of adjustable parameters to optimize the performance parameter,
   wherein the non-linear equalization element is a non-linear phase rotator, and
   wherein the linear equalization element compensates for dispersion and the non-linear equalization element compensates for nonlinearity in each of the at least two of the plurality of cascaded stages.

14. The system of claim 13, wherein the processor is arranged to adaptively determine values for the parameters during operation of the optical transmission system.

15. A node for an optical transmission system, comprising:
   an equalizer for processing, in a digital electrical domain, a signal obtained from a path of an optical transmission system, the equalizer disposed in a digital signal processor and comprising a plurality of cascaded stages, where at least two of the plurality of cascaded stages each comprise a cascade of:
   a linear equalization element; and
   a non-linear equalization element, the linear equalization element and the non-linear equalization element each comprising adjustable parameters,
   wherein the node is configured to monitor a performance parameter of the equalizer and to control values of the adjustable parameters to optimize the performance parameter,
   wherein the non-linear equalization element is a non-linear phase rotator, and wherein the linear equalization element compensates for dispersion and the non-linear equalization element compensates for nonlinearity in each of the at least two of the plurality of cascaded stages.

16. The node of claim 15, further comprising a receiver, the receiver comprising:
   an input for receiving an optical signal from a transmission path of the optical transmission system; and
   an optical-to-electrical converter for converting the received optical signal into an electrical signal;
   wherein the equalizer is arranged to process the electrical signal.

17. The node of claim 15, further comprising a transmitter, wherein the equalizer is arranged to process a communication signal in the electrical domain, and the transmitter comprises:
   an electrical-to-optical converter for converting a processed communication signal into an optical signal; and
   an output for transmitting the optical signal onto a transmission path of the optical transmission system.

18. A method of equalizing, in a digital electrical domain, a signal obtained from a path of an optical transmission system, the method comprising:
   processing the signal by digital signal processer comprising a plurality of cascaded processing stages, wherein at least two of the plurality of cascaded processing stages performs:
      processing the signal with a linear equalization function; and
      processing the signal with a non-linear equalization function, the linear equalization function and the non-linear equalization function comprising configurable parameters,
   wherein a performance parameter is monitored and values of the configurable parameters are adjusted to optimize the performance parameter,
   wherein the non-linear equalization function is a non-linear phase rotator, and
   wherein the processing of the signal with the linear equalization function compensates for dispersion and the processing of the signal with the non-linear equalization function compensates for nonlinearity in each of the at least two of the plurality of cascaded processing stages.

19. The method of claim 18, further comprising:
   receiving an optical signal from a transmission path of the optical transmission system; and
   converting the optical signal into an electrical signal;
   wherein the method of equalizing is performed on the electrical signal.

20. The method of claim 18, wherein the method of equalizing is performed on an electrical signal to form an equalized electrical signal, and the method further comprises:
   converting the equalized electrical signal into an optical signal; and
   outputting the optical signal onto a transmission path of the optical transmission system.

21. A non-signal machine-readable medium carrying machine readable instructions for causing a processor to perform a method of equalizing, in a digital electrical domain, a signal obtained from a path of an optical transmission system, wherein the method comprises:
   processing the signal by digital signal processor comprising a plurality of cascaded processing stages, wherein at least two of the plurality of cascaded processing stages performs:
      processing the signal with a linear equalization function; and
      processing the signal with a non-linear equalization function, the linear equalization function and the non-linear equalization function comprising configurable parameters,
   wherein a performance parameter is monitored and values of the configurable parameters are adjusted to optimize the performance parameter,
   wherein the non-linear equalization function is a non-linear phase rotator, and
   wherein the processing of the signal with the linear equalization function compensates for dispersion and the processing of the signal with the non-linear equalization function compensates for nonlinearity in each of the at least two of the plurality of cascaded processing stages.

* * * * *

UNITED STATES PATENT AND TRADEMARK OFFICE
CERTIFICATE OF CORRECTION

PATENT NO. : 9,166,703 B2  
APPLICATION NO. : 13/148309  
DATED : October 20, 2015  
INVENTOR(S) : Secondini et al.

It is certified that error appears in the above-identified patent and that said Letters Patent is hereby corrected as shown below:

On the title page item 57, under "ABSTRACT", in Column 2, Line 17, delete "(HR)" and insert -- (IIR) --, therefor.

In the Specification

In Column 6, Line 16, delete "$x_{i+1}[n] = y_i[n]\exp(jc_i|y_i[n]|^2)$" and insert -- $x_{i-1}[n] = y_i[n]\exp(jc_i|y_i[n]|^2)$ --, therefor.

$$x_1[n] = Ax_0[n]$$

$$y_i[n] = a_i y_i[n-1] + x_i[n] + b_i x_i[n-1]$$

In Column 7, Lines 4-8, delete "$x_{i+1}[n] = y_i[n]\exp(jc_i|y_i[n]|^2)$" and $$x_1[n] = Ax_0[n]$$
$$y_i[n] = a_i y_i[n-1] + x_i[n] + b_i x_i[n-1]$$

insert -- $x_{i+1}[n] = y_i[n]\exp(jc_i|y_i[n]|^2)$ --, therefor.

Signed and Sealed this  
Fifteenth Day of March, 2016

Michelle K. Lee  
*Director of the United States Patent and Trademark Office*